US012712754B1

(12) United States Patent
Mayfield et al.

(10) Patent No.: US 12,712,754 B1
(45) Date of Patent: Aug. 18, 2026

(54) ENHANCED CONFERENCE ROOMS FOR PERSISTENT HYBRID VIRTUAL COLLABORATIVE WORKSPACES

(71) Applicant: Zoom Video Communications, Inc., San Jose, CA (US)

(72) Inventors: Ross Douglas Mayfield, Palo Alto, CA (US); Robert Allen Ryskamp, Mountain View, CA (US); Jeffrey William Smith, Layton, UT (US); Matthew Brandon Wesson, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 43 days.

(21) Appl. No.: 18/765,995

(22) Filed: Jul. 8, 2024

Related U.S. Application Data

(63) Continuation of application No. 17/733,505, filed on Apr. 29, 2022, now Pat. No. 12,034,554.

(51) Int. Cl.
*H04L 12/18* (2006.01)

(52) U.S. Cl.
CPC ...... *H04L 12/1822* (2013.01); *H04L 12/1818* (2013.01); *H04L 12/1831* (2013.01)

(58) Field of Classification Search
None
See application file for complete search history.

(56) References Cited

U.S. PATENT DOCUMENTS 8,514,842 B1 8/2013 Jared et al.
8,631,076 B1 1/2014 Auerbach et al.
(Continued)

FOREIGN PATENT DOCUMENTS

WO 2009105298 A2 8/2009
WO WO-2018106675 A1 * 6/2018 ............ G06F 3/016

OTHER PUBLICATIONS

U.S. Appl. No. 17/733,505 , Final Office Action, Mailed On Sep. 28, 2023, 20 pages.
(Continued)

*Primary Examiner* — Phyllis A Book
(74) *Attorney, Agent, or Firm* — Kilpatrick Townsend & Stockton LLP

(57) ABSTRACT

One example method includes determining, by a computing device, a user present in a room is associated with a virtual space hosted at a video conference provider, wherein the room includes one or more peripheral devices; connecting, by the computing device, to the virtual space; receiving, by the computing device, data from at least one of the one or more peripheral devices or one or more user devices while connected to the virtual space, the one or more user devices associated with the user or one or more other users within the room; transmitting, by the computing device, at least a portion of the data to the virtual space; determining, by the computing device, a state change associated with the room based on the data received from the one or more peripheral devices or one or more user devices; generating, by the computing device, a change detection signal; and transmitting, by the computing device, the change detection signal to the video conference provider to cause the video conference provider to store data associated with the change detection signal in the virtual space.

17 Claims, 11 Drawing Sheets

(56) References Cited

U.S. PATENT DOCUMENTS

| | | | |
|---|---|---|---|
| 9,392,225 | B2 | 7/2016 | Eisenberg |
| 10,091,253 | B2 | 10/2018 | Sedar et al. |
| 10,375,125 | B2 | 8/2019 | Rosenberg et al. |
| 10,432,676 | B2 | 10/2019 | Cutler et al. |
| 10,721,280 | B1 * | 7/2020 | Heppner ............... H04L 65/403 |
| 10,931,918 | B1 * | 2/2021 | Griffin .................... G10L 17/00 |
| 11,570,220 | B1 | 1/2023 | Norheim et al. |
| 11,606,220 | B2 | 3/2023 | Jorasch et al. |
| 12,034,554 | B2 | 7/2024 | Mayfield et al. |
| 2007/0283278 | A1 | 12/2007 | Hupfer et al. |
| 2010/0251142 | A1 | 9/2010 | Geppert et al. |
| 2012/0182384 | A1 | 7/2012 | Anderson et al. |
| 2014/0098947 | A1 | 4/2014 | Dingsor et al. |
| 2014/0115502 | A1 | 4/2014 | Van Wie et al. |
| 2014/0236876 | A1 | 8/2014 | Hapse et al. |
| 2015/0049162 | A1 | 2/2015 | Kurupacheril et al. |
| 2017/0195266 | A1 | 7/2017 | Moyers |
| 2017/0302709 | A1 | 10/2017 | Jones et al. |
| 2018/0124359 | A1 | 5/2018 | Faulkner |
| 2019/0215183 | A1 | 7/2019 | Krasadakis |
| 2019/0251753 | A1 * | 8/2019 | Canada ................... G06T 11/60 |
| 2019/0273767 | A1 | 9/2019 | Nelson et al. |
| 2021/0185105 | A1 | 6/2021 | Van Wie et al. |
| 2021/0211317 | A1 * | 7/2021 | Khan ..................... H04N 7/155 |
| 2021/0289167 | A1 | 9/2021 | Griffin |
| 2021/0357639 | A1 | 11/2021 | Campbell et al. |
| 2021/0400142 | A1 | 12/2021 | Jorasch et al. |
| 2022/0182581 | A1 * | 6/2022 | Oz ......................... H04N 7/157 |
| 2022/0321369 | A1 | 10/2022 | Lin et al. |
| 2022/0360742 | A1 * | 11/2022 | Krol ........................ G10L 25/51 |
| 2023/0008964 | A1 | 1/2023 | Fernandez Guajardo et al. |
| 2023/0045116 | A1 | 2/2023 | Pitts et al. |
| 2023/0156156 | A1 | 5/2023 | Zhang |
| 2023/0252686 | A1 * | 8/2023 | LeCesne ................ G06V 20/20 |
| 2023/0269283 | A1 | 8/2023 | Chun et al. |
| 2023/0281901 | A1 * | 9/2023 | Oz ............................ G06T 7/20 345/419 |
| 2023/0306484 | A1 | 9/2023 | Van Wie et al. |
| 2024/0104896 | A1 | 3/2024 | Green et al. |

OTHER PUBLICATIONS

U.S. Appl. No. 17/733,505 , Non-Final Office Action, Mailed On Apr. 6, 2023, 19 pages.

U.S. Appl. No. 17/733,505 , Notice of Allowance, Mailed On Mar. 6, 2024, 10 pages.

U.S. Appl. No. 17/733,436 , Final Office Action, Mailed On Jun. 10, 2024, 15 pages.

U.S. Appl. No. 17/733,436 , Non-Final Office Action, Mailed On Nov. 9, 2023, 13 pages.

U.S. Appl. No. 17/733,436 , Non-Final Office Action, Mailed On Nov. 5, 2024, 15 pages.

U.S. Appl. No. 17/733,436 , Advisory Action, Mailed On Jun. 20, 2025, 3 pages.

U.S. Appl. No. 17/733,436 , Final Office Action, Mailed On Apr. 9, 2025, 16 pages.

U.S. Appl. No. 17/733,436 , Notice of Allowance, Mailed On Sep. 3, 2025, 9 pages.

U.S. Appl. No. 17/733,436 , Notice of Allowance, Mailed On Jan. 21, 2026, 8 pages.

* cited by examiner

ENHANCED CONFERENCE ROOMS FOR PERSISTENT HYBRID VIRTUAL COLLABORATIVE WORKSPACES

CROSS-REFERENCE TO RELATED APPLICATIONS

This application is a continuation of U.S. patent application Ser. No. 17/733,505, filed Apr. 29, 2022, titled "Enhanced Conference Rooms for Persistent Hybrid Virtual Collaborative Workspaces," the entirety of which is hereby incorporated by reference.

FIELD

The present application generally relates to video conferencing, and more particular relates to an enhanced conference rooms for persistent hybrid virtual collaborative workspaces.

DETAILED DESCRIPTION

Examples are described herein in the context of enhanced conference rooms. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferences provide a way for groups to meet and collaborate across distances great and small. Frequently, video conferences are used to hold meetings where many of the video conference participants are remote from each other. Video conferences may be used even when some—or even most—of the meeting participants are in the same location but need to include remote participants. In this case, the "local" participants may have access to each other and whatever resources are held at the location (such as a pin board) whereas the remote users may only see those resources that are provided through the video conference. Even if changes to a pin board or other resources are provided via the video conference, the remote users may not notice the change. In other words, the lack of being physically present may hinder at least the remote users' ability to collaborate fully, or even be fully up to date with the changes made within a meeting.

The systems and methods disclosed herein may overcome some of these issues. For example, a conference room may include functionalities to detect changes to a resource within the conference room. The system may update the change in a virtual space, such that the remote user may track or find the change even if they fail to notice the change in real time. Further, even if a remote user was not present at the meeting, they may be able to see the changes and resources within the conference room.

Figure 1:
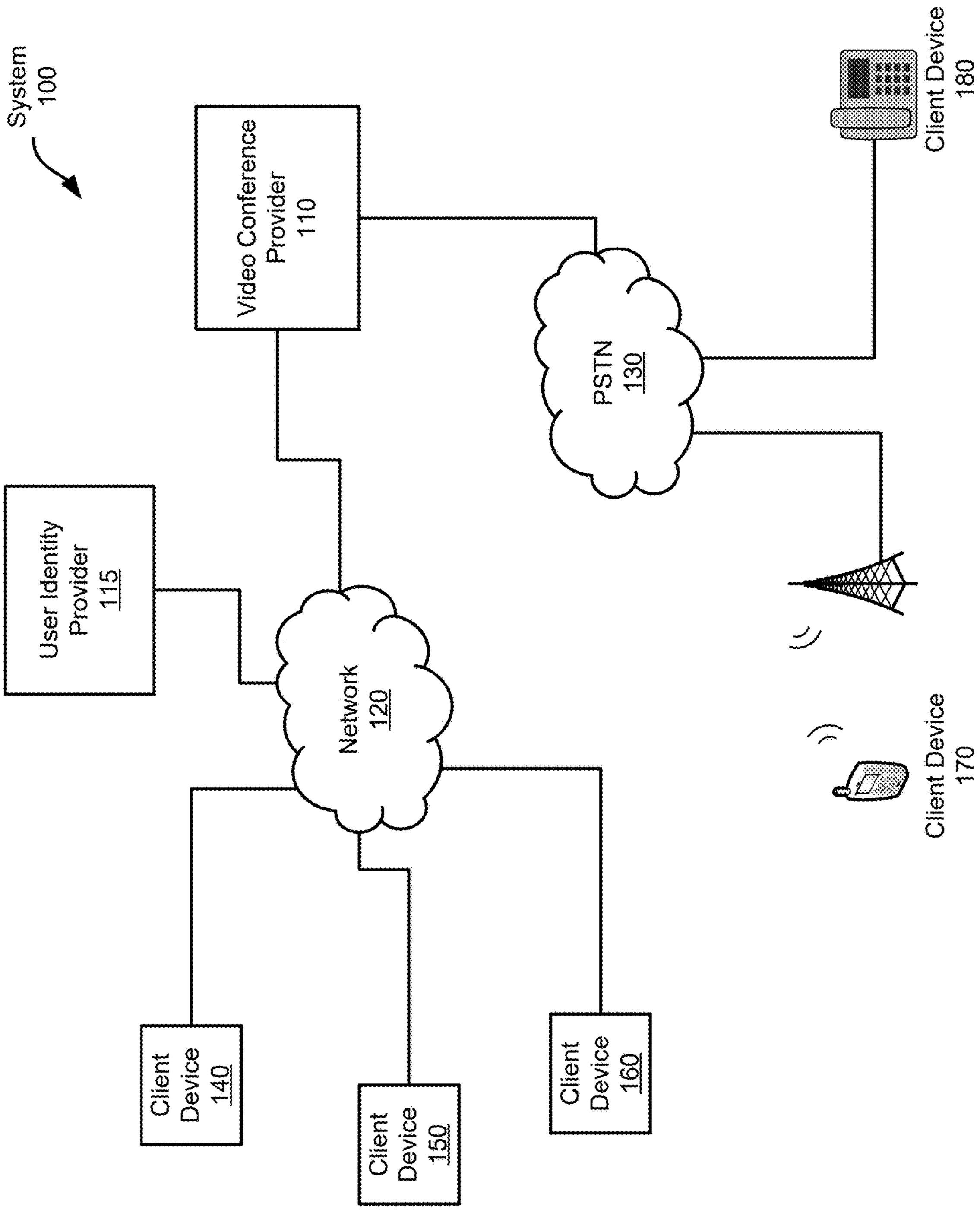
FIGS. 1-3 show example systems for providing persistent hybrid virtual collaborative workspaces.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
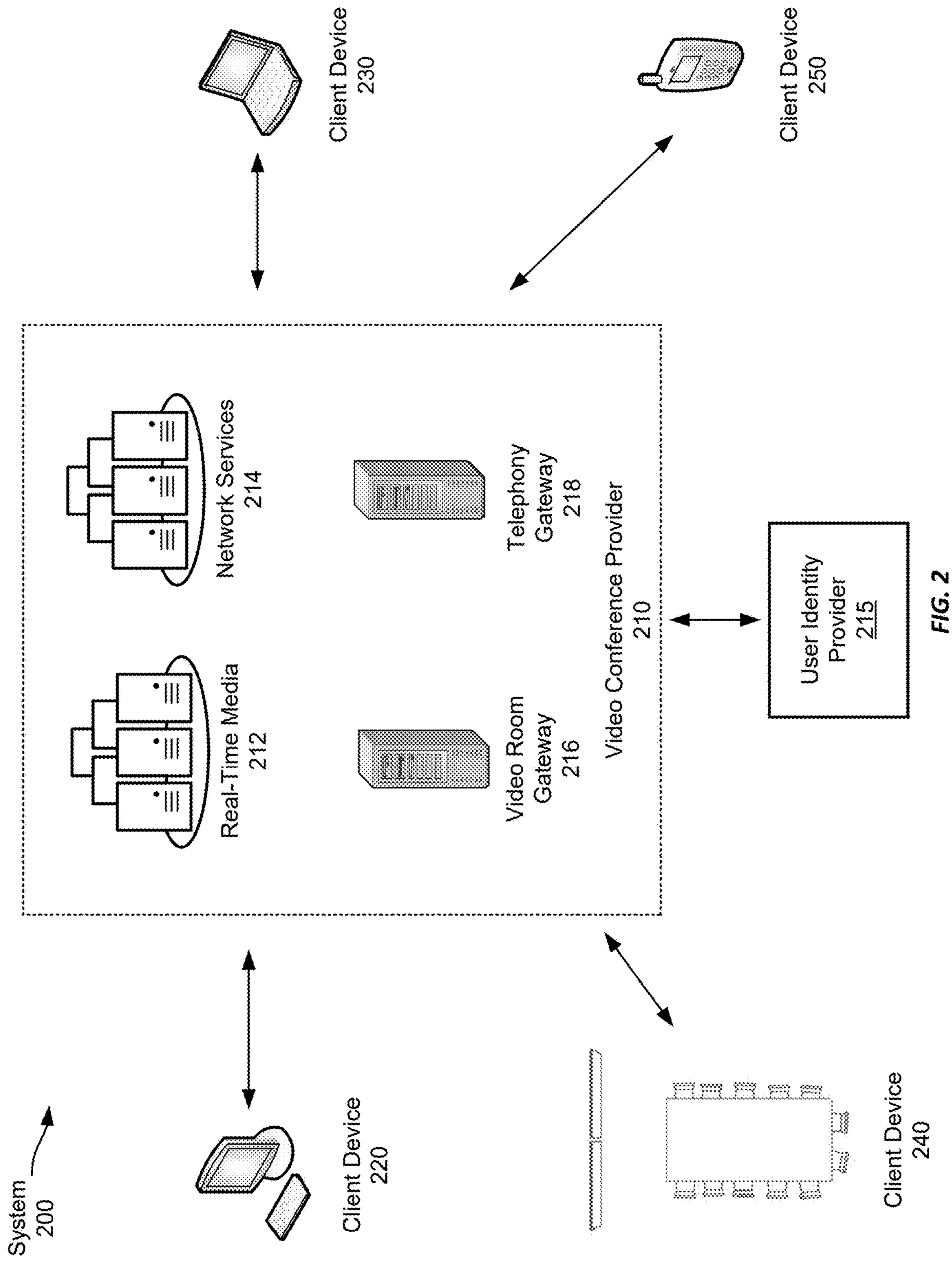

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
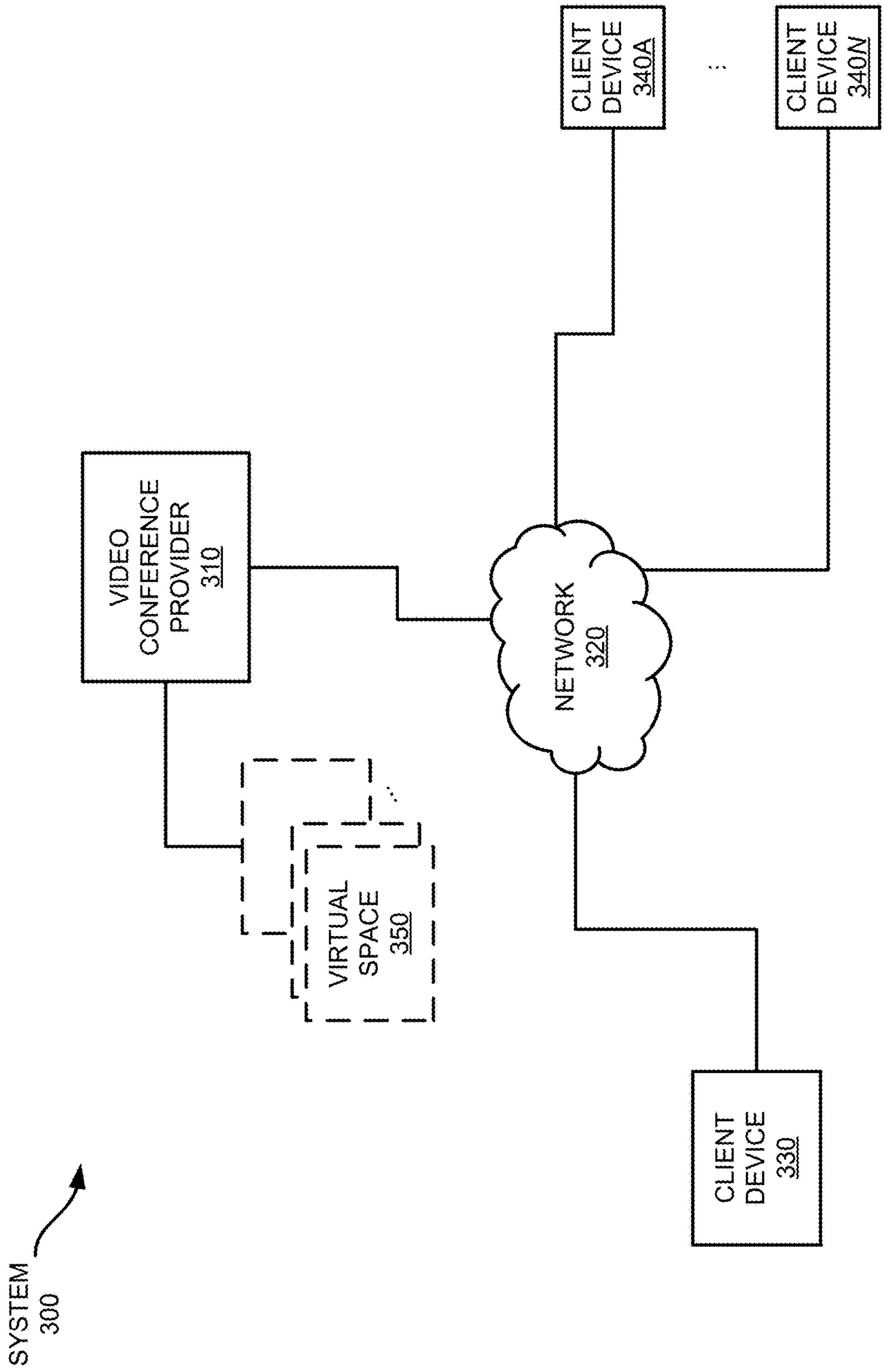

Referring now to FIG. 3, FIG. 3 shows an example system 300 for providing one or more persistent hybrid virtual collaborative workspaces. The system 300 shown in FIG. 3 includes a video conference provider 310 that has established and maintains multiple virtual spaces 350. The system 300 also includes multiple client device 330, 340*a-n* that are connected to the video conference provider 310 via a network. In this example, the network 320 is the internet; however, any communications network or combination of communications networks may be employed. And while the system 300 is depicted as including multiple client device 330, 340*a-n*, it should be appreciated that some example systems may not include any client devices at any particular time. Rather, the video conference provider 310, which establishes and maintains virtual spaces 350 may be sufficient as a system for persistent hybrid virtual collaborative workspaces, to which one or more client devices may connect.

The video conference provider 310 establishes new spaces at the request of corresponding users and stores one or more records in a database to represent the configuration and state of the space. For example, when a space is first established, it may not have any resources or members, other than the user who requested that the space be created. However, as documents, other users, meetings, or other content are added to or created within the space, the video conference provider 310 may add links or references to those resources or users. Thus, in some examples, the various resources may not be stored within the database or even stored by the video conference provider 310. Instead, the space provides a nexus through which such resources may be accessed, such as by traversing a universal resource locator ("URL"), by accessing a document within a document management system or stored in a local networked storage area. However, it should be appreciated that some examples may store individual resources as records within the database along with the configuration and state of the space itself.

Each of the spaces 350 established and maintained by the video conference provider 310 allows members of the respective space to connect to the space, interact with resources available within the space, and interact with other users that are connected to the space. However, each of the spaces 350 persists independently of whether any users are connected to the space or resources are available within the space. Thus, the space remains latent and available for use by any member of the space at any time.

Figure 4:
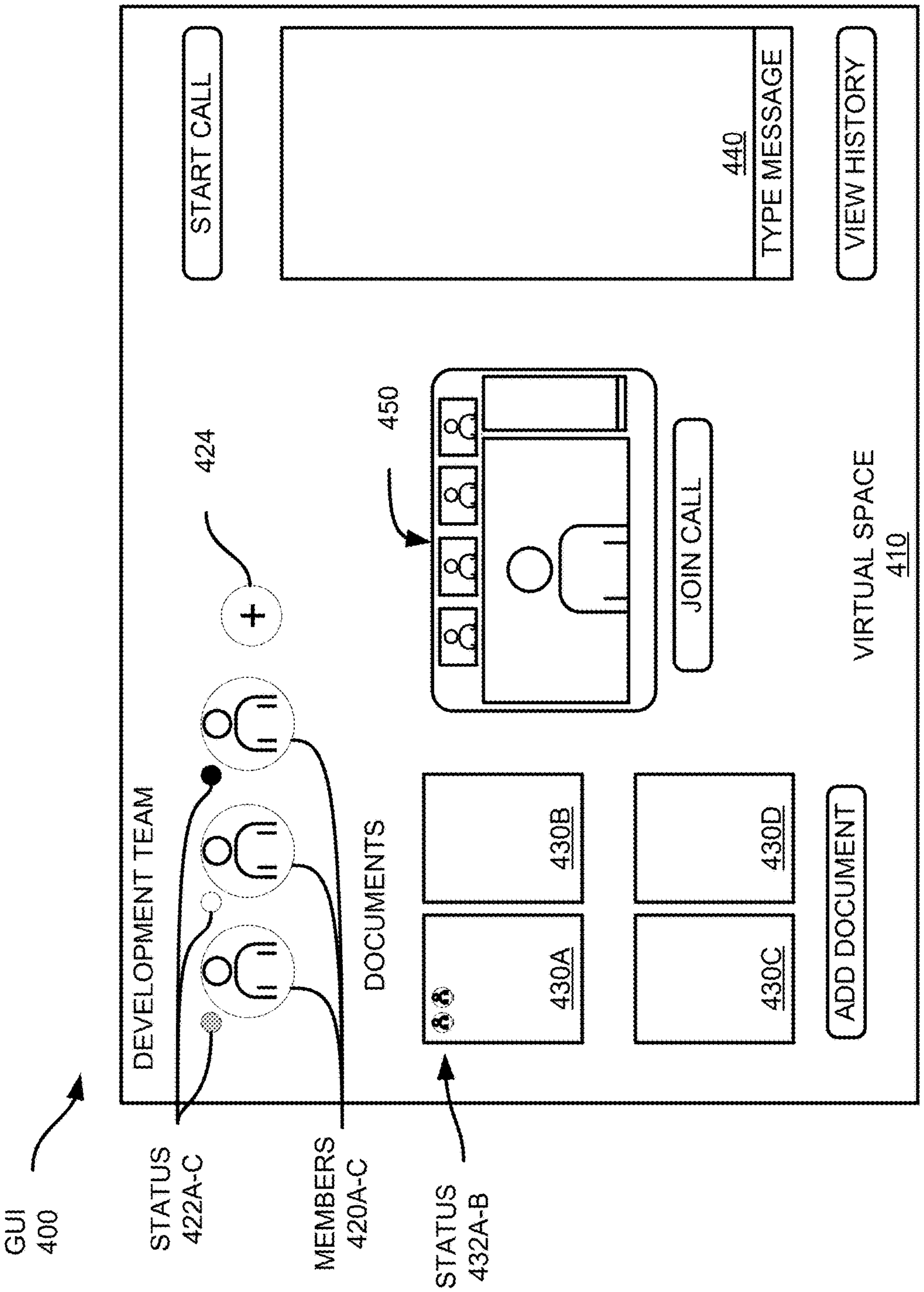
FIGS. 4-6 show example graphical user interfaces ("GUIs") for persistent hybrid virtual collaborative workspaces.

Referring now to FIG. 4, FIG. 4 shows a graphical user interface ("GUI") 400 view of a virtual space 410 provided by the video conference provider 310. The virtual space 410 in this example has multiple team members 420*a-c* that have been added to the virtual space 410. In addition, the GUI 400 provides the option 424 to add additional team members to the virtual space 410. The virtual space 410 has also been updated to include four documents 430*a-d*, which may be accessed by members of the virtual space 410. The virtual space has also been configured to allow members 420*a-c* to add documents to the virtual space by using the "Add Document" option and to create and participate in video conferences within the space by using the "Start Call" option. Similarly, when a video conference is in-progress within the virtual space 410, the GUI 400 provides a representation of the video conference 450. This allows members 420*a-c* of the space to see that a video conference is in-progress and who is within the video conference. The GUI 400 also provides the option to join the call via the "Join Call" button. The virtual space 410 has also been configured with chat functionality 440 to allow the members 440*a-c* to interact via text chat. Further, the virtual space 410 provides a "View History" option to allow the members 420*a-c* to view past events within the space, such as recordings of past video conferences, chat interactions, when team members have joined or left the space, or other events of interest.

In addition to providing access to the resources discussed above, the virtual space 410 can also provide status information to assist team members in understanding the current state of the virtual space. For example, as discussed above, the GUI 400 representation of the virtual space 410 provides a status indication that a video conference 450 is in-progress. In this example, the GUI 400 provides a static, stylized representation of a video conference, but the representation does not actually provide any content from the video conference. Instead, a team member 420*a-c* would need to join the video conference to obtain audio or video feeds or other information shared within the conference. However, in some examples the representation 450 may show the content of the video conference. Thus, the members 420*a-c* may be able to see the video feeds within the representation of the video conference 450 or, by selecting an option, may be able to hear the audio from the video conference without actually joining the video conference. When a member 420*a-c* is observing a video conference in such a manner, the participants within the video conference may be notified that the team member is observing the video conference. Further, some examples may provide options to activate a microphone and camera as an implicit command to join the meeting. Thus, a team member may observe an on-going conference and, if they elect to join, may simply activate their microphone and camera to join the meeting and begin contributing. Such functionality may more closely resemble an in-person meeting in a conference room where team members passing by may notice the meeting and spontaneously decide to join. Alternatively, the participants in the meeting may note that the team member is observing meeting and may send a request to the team member to join the meeting.

Other status information may be provided as well. For example, each of the team members is represented within the virtual space 410 by a stylized portrait 420*a-c* along with a corresponding status indicator 422*a-c*. The status indicators may indicate the current status of the team members 420*a-c*. For example, team member 420*c* has a dark status indicator 422*c*, indicating that the team member 420*c* is offline. Team member 420*b* has a bright status indicator, indicating that they are online and active, while team member 420*a* has a dimmed status indicator, indicating that they are online, but inactive. Thus, a team member can easily determine whether other team members are available for collaboration. Similarly, documents or other resources may provide indications of whether one or more members of the space is accessing the document or resource. For example, document 430*a* is being accessed by two members of the virtual space 410 as illustrated by status indicators 432*a-b*. To gain more information about which members are accessing the document, a user may select one of the indicators 432*a-b* to obtain information about the corresponding member, such as the member's name. Still other status information may be provided according to other examples.

Figure 5:
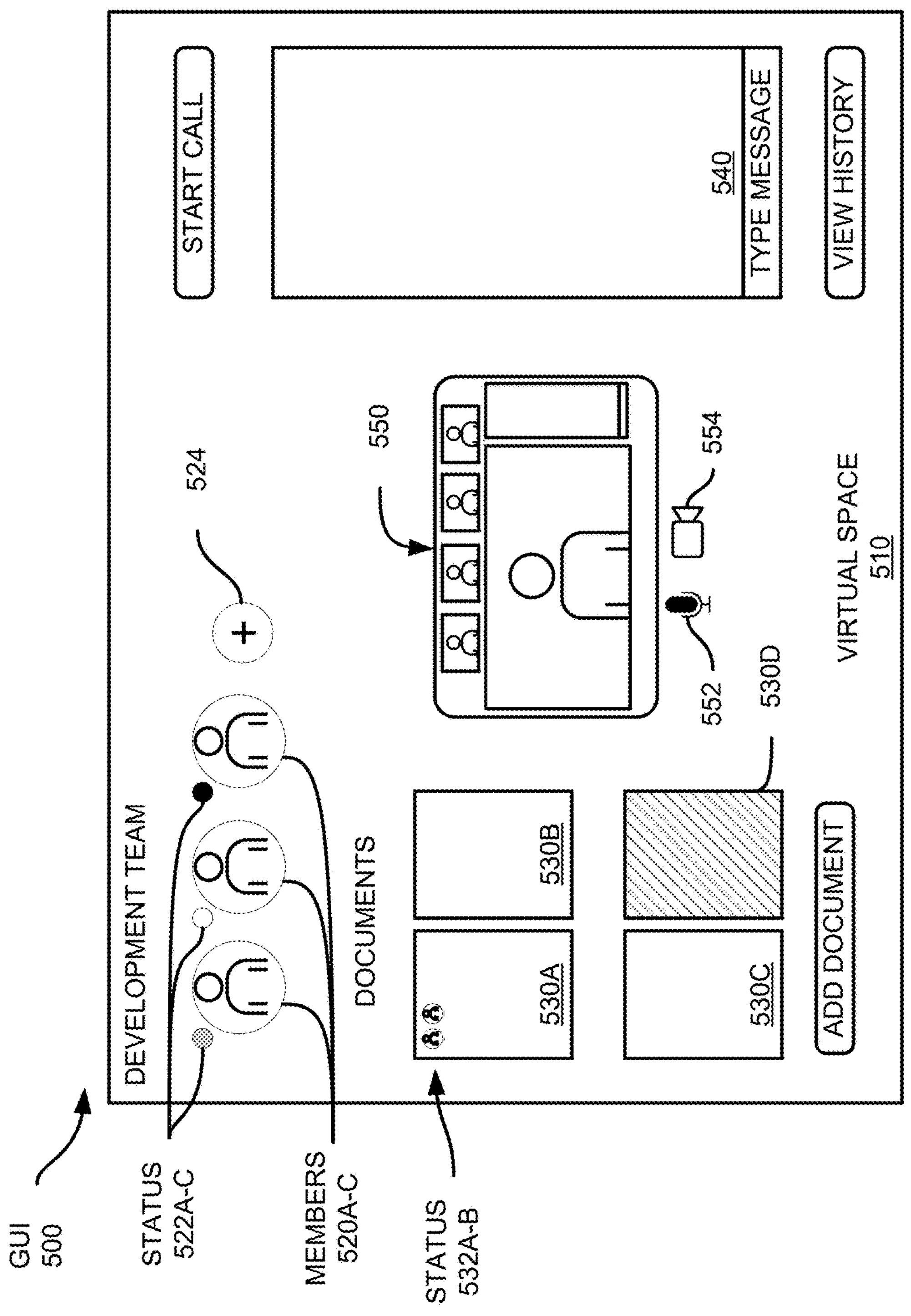

Referring now to FIG. 5, FIG. shows another GUI 500 representation of a virtual space 510. The GUI 500 in this example includes many of the same features as those shown in FIG. 4, including multiple members 520*a-c* of the space and corresponding status indicators 522*a-c*, an option 524 to add members to the virtual space 510, multiple documents 530*a-d* and corresponding status indicators 532*a-b*, a chat window, and a representation of an on-going video conference 550. However, unlike the GUI 400 shown in FIG. 4, this representation of the virtual space 510 allows a user to seamlessly join the on-going video conference by selecting the options to activate a microphone 552 and activate a camera 554. Thus, the user may simply join the meeting by activating their input devices, or may only enable one or the other to speak without visually appearing in the video conference, or simply appear within the video conference without providing audio.

In addition to these differences, the virtual space 510 in this example has been configured to allow team members to apply permissions to different content within the virtual space 510. In this example, the user viewing the GUI 500 representation of the virtual space 500 is presented with four available documents 530*a-d*; however, document 530*d* has been shaded to indicate that the user does not have permission to view or otherwise access the document 530*d*. In some examples, however, if a team member does not have permission to access a document, the document may not be represented within their GUI 500 view of the virtual space 500, thus they may not be aware of its existence.

Figure 6:
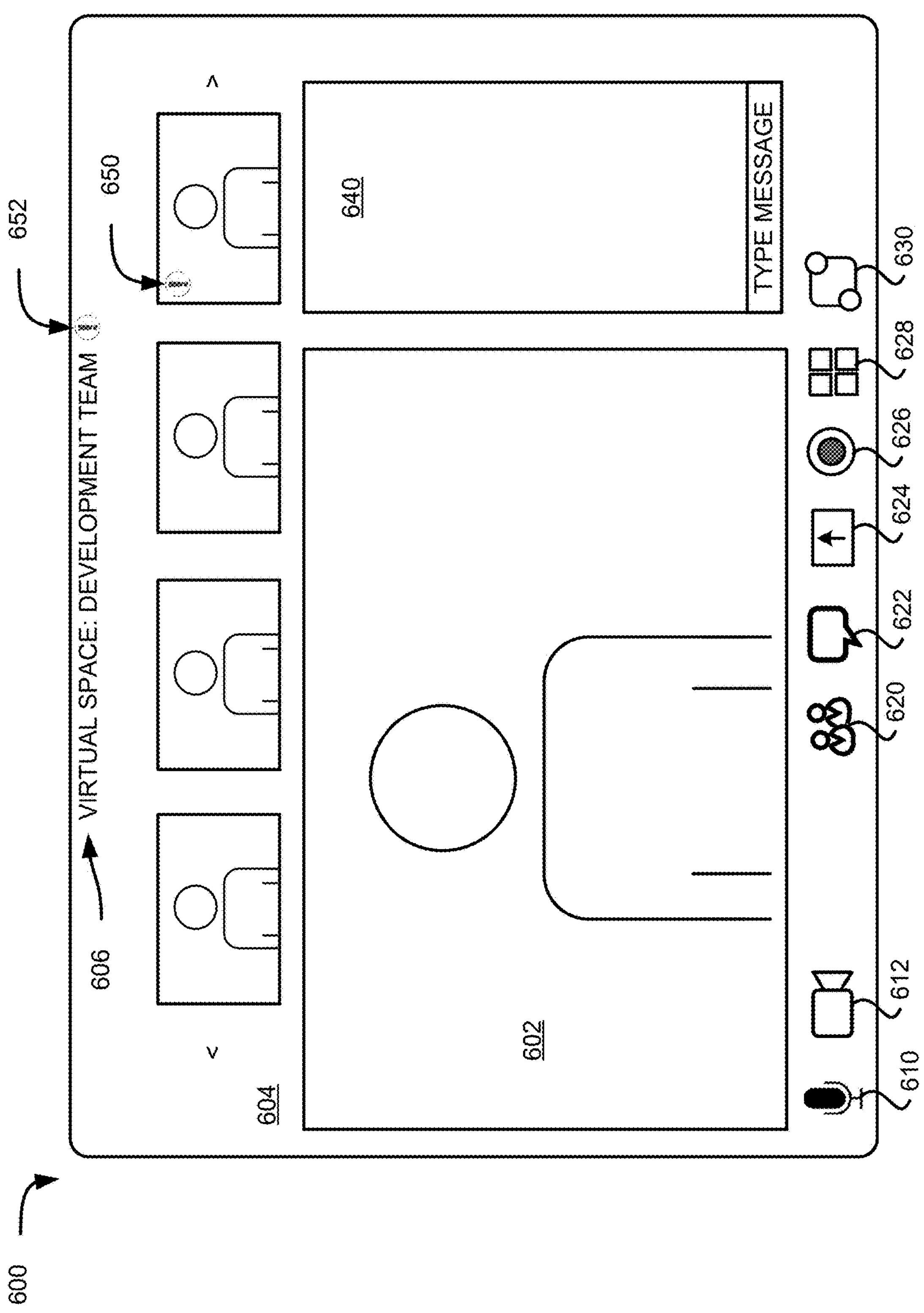

Referring now to FIG. 6, FIG. 6 shows an example GUI 600 presented to participants in a video conference that has been attached to a space. A client device, e.g., client device 330 or client devices 340*a-n*, executes video conferencing software, which in turn displays the GUI 600 on the client device's display. In this example, the GUI 600 includes a speaker view window 602 that presents the current speaker in the video conference. Above the speaker view window 602 are smaller participant windows 604, which allow the participant to view some of the other participants in the video conference, as well as controls ("<" and ">") to let the host scroll to view other participants in the video conference. On the right side of the GUI 600 is a chat window 640 within which the participants may exchange chat messages.

Beneath the speaker view window 602 are a number of interactive elements 610-630 to allow the participant to interact with the video conference software. Controls 610-612 may allow the participant to toggle on or off audio or video streams captured by a microphone or camera connected to the client device. Control 620 allows the participant to view any other participants in the video conference with the participant, while control 622 allows the participant to send text messages to other participants, whether to specific participants or to the entire meeting. Control 624 allows the participant to share content from their client device. Control 626 allows the participant toggle recording of the meeting, and control 628 allows the user to select an option to join a breakout room. Control 630 allows a user to launch an app within the video conferencing software, such as to access content to share with other participants in the video conference.

During the normal course of a video conference, the user interacts with the video conferencing application and other participants via the GUI 600. In addition, because the video conference has been attached to a space, e.g., spaces 400, 500, the GUI 600 identifies the virtual space that the video conference is attached to by providing a caption 606 at the top of the GUI. In addition, an indicator 652 is provided next to the caption 606 to indicate that the conference is being recorded. In some examples, virtual spaces may automatically record video conferences that are created from within the space or that are attached to the space to provide a record of the video conference if members of the space would like to review the meeting after it has ended.

In addition, because the GUI 600 is attached to a space, members of the space may be able to interact with the video conference without joining the video conference, as discussed above. For example, a member of the space may wish to listen into the meeting or access video to view documents or other content being displayed within the video conference. Thus, the member may observe the video conference without joining it. In some examples, the GUI 600 may provide an indication that a member of the space is observing the video conference by adding a stylized representation of the member within the participant window region 604 of the GUI 600 and include and indicator 650 to let other participants in the video conference that the member of the space is observing the video conference, but has not joined it.

Figure 7:
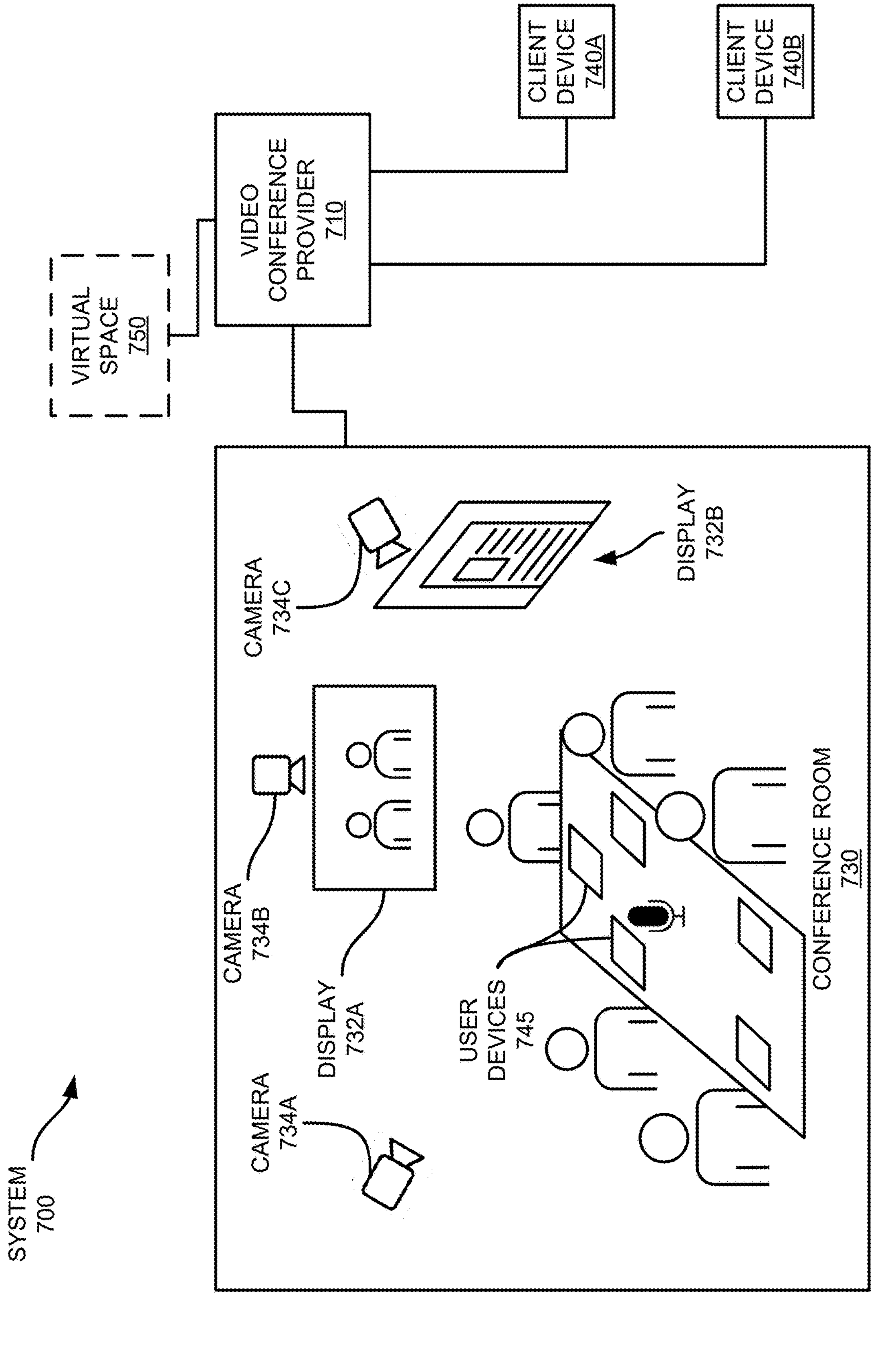
FIGS. 7-8 show example systems for providing persistent hybrid virtual collaborative workspaces.

Referring now to FIG. 7, FIG. 7 illustrates an example system 700 for providing persistent hybrid virtual spaces. The system 700 includes a video conference provider 710 that has established and is maintaining a virtual space 750. In addition, multiple client devices are connected to the video conference provider 710. One of the client devices includes video conferencing equipment installed within a physical conference room 730, while two additional client devices 740*a-b* are computing devices operated by users remote from the conference room 730, but that are connected to the virtual space 750. In this example, the video conference equipment in the conference room 730 includes two displays 732*a-b* and three cameras 734*a-c*. In addition, five user devices 745 are provided as a part of the video conferencing equipment, which are provided in addition to any user devices the attendees of the meeting may have brought with them. The user devices 745 are integrated into the video conferencing equipment to enable users in the conference room 730 to control different aspects of the video conferencing equipment, such as content presented on the displays 732*a-b* or positioning of one or more of the cameras 734*a-c*.

As discussed above, the user devices 745 may also be associated with attendees of the meeting (e.g., a mobile device an attendee may have brought). The computing device may determine that one or more of the user devices 745 are associated with the attendees of the meeting. The computing device may then transmit a roster signal, including the names or other information about the attendees of the meeting in the conference room, to the video conference provider. The video conference provider may then use the roster signal to update the virtual space 750. The video conference provider may also send an alert to one or more client devices (not pictured) associated with members of the virtual space 750, indicating that a meeting is in progress.

In this example, the conference room 730 has connected to the video conference provider 710 and has attached to the virtual space 750. In this example, the video conferencing equipment includes a computing device (not shown) that controls the cameras 734*a-c*, the displays 732*a-b*, and the microphone, which is positioned on the conference table, though multiple microphones may be employed in some examples. In addition, the computing device may receive instructions from the user devices 745 as discussed above, such as to control the displays or the cameras, to access content within the virtual space 710, or to interact with one or more team members within the virtual space 710. The computing device may be located in the conference room 730, or the computing device may be located elsewhere.

After connecting to the video conference provider 710, one of the users can select a virtual space 750 to connect to. Once the conference room 730 is connected to the virtual space 750, other members of the virtual space 750 may see that the conference room is attached, such as by being presented with a representation of a video conference, such as the example representations 450, 550 shown in FIGS. 4 and 5. Thus, other members of the virtual space 750 can see that the meeting is in-progress and can decide whether to observe or join remotely, such as users of client devices 740*a-b*. Further, while this example system 700 shows only one conference room 730 connected to the space, in some examples, multiple conference rooms may be connected to the same space in one or more video conferences.

In an example, a member of the virtual space 750 may attempt to virtually join the conference room (and/or the meeting). The computing device may receive an indication that the member wishes to join the conference room. The computing device may then join a video conference associated with the virtual space 750, such that the user devices 745 may also join the video conference. The computing device may further provide information from one or more peripheral devices to the video conference via the video conference provider 710.

In some examples, there may not be a video conference associated with the virtual space 750. The computing device may then send a signal to the video conference provider 710 causing the video conference provider to start a video conference. The user devices 745 may then be prompted by the video conference provider and/or the computing device to join the video conference. Additionally, the video conference provider may update the virtual space 750 to indicate a meeting is occurring.

After the meeting has concluded, the participants in the conference room 730 can disconnect from the space, at which time the meeting and a corresponding representation within a GUI may be removed from the virtual space. However, in some examples, a conference room 730 may remain attached after the participants have concluded a meeting, and thus the video conference may persist along with a representation of the meeting within the space. In one such an example, other members of the space may view the conference room from within the space and interact with it, such as by observing one or more video feeds from the conference room, such as to review information posted on whiteboards or other physical objects within the conference room 730, such as a pinboard. Thus, the physical conference room may become an extension of the virtual space where remote participants can still interact with the conference room, even outside of the context of an active video conference.

During the course of the meeting, one or more physical objects in the room may go through a state change. For example, a user might change something on a physical whiteboard, such as by writing or drawing on the whiteboard or erasing something already present, or add or remove an item from a pinboard. The computing device may receive a signal from one or more of the peripheral devices, where the signal includes information related to the state change (e.g., a video feed of an item being added to a pinboard). The computing device may then determine that the state change occurred, and send a change detection signal to the video conference provider causing the virtual space to store data associated with the state change. In some examples, the computing device may determine that a state change occurred from a live feed from the one or more peripheral devices via a machine learning model trained in object recognition or other such method. In other examples, the computing device may determine the state change occurred based on signals taken at regular intervals (e.g., a series of pictures taken by a camera evert 15 seconds, where the state change is determined by comparing two or more sequential pictures). A machine learning model may then be used to determine if the signals include a change to a resource in the conference room, or is an unimportant change (e.g., people moving within the conference room).

Figure 8:
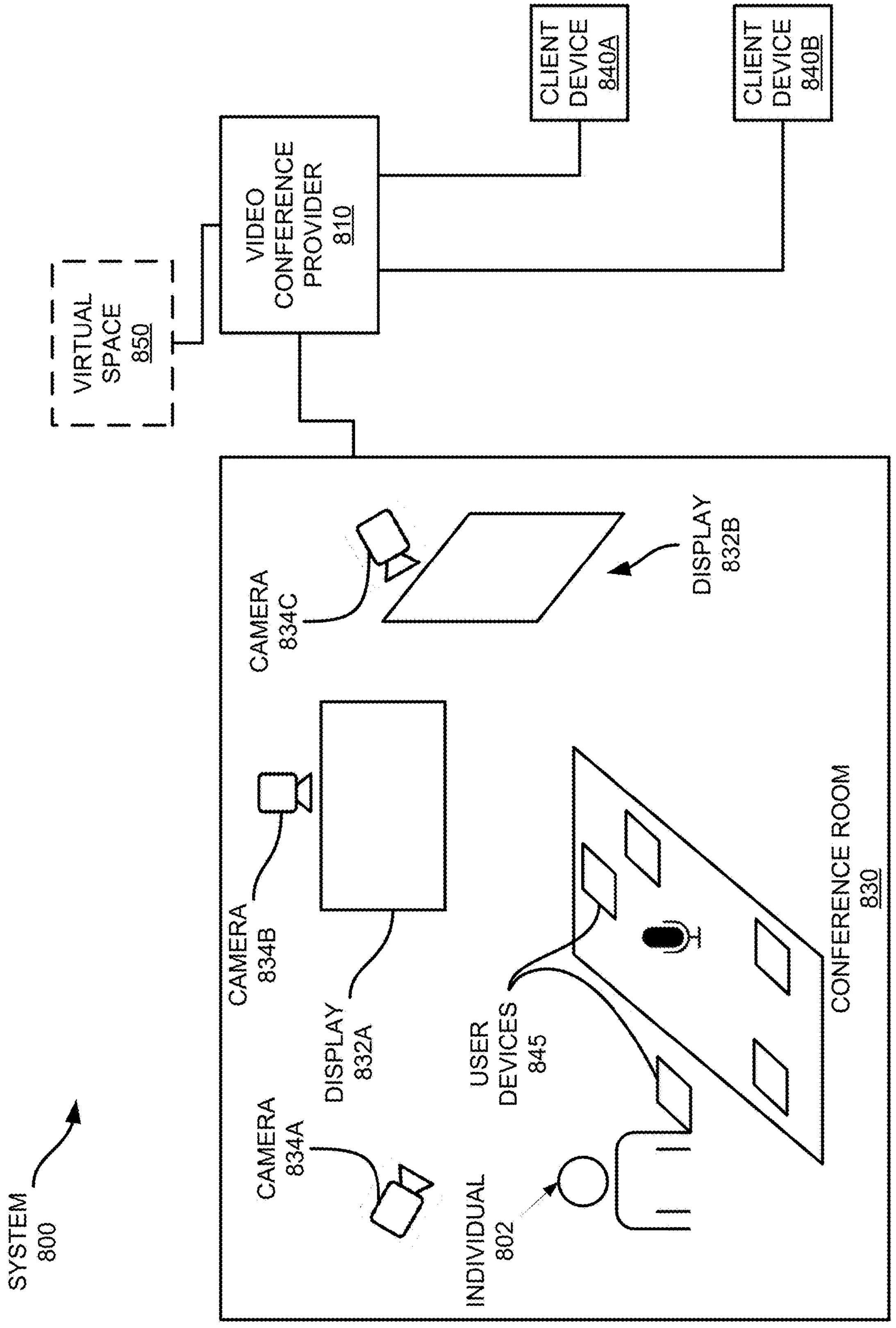

FIG. 8 illustrates an example system 800 for providing persistent hybrid virtual spaces where an individual 802 is automatically joined to the virtual space. The system 800 may be identical to the system 700 described in FIG. 7. Therefore, some or all of the components described in FIG. 7 may be included in the system 800, and include cameras 834*a-c*, displays 832*a-b*, the conference room 830, etc.

The individual 802 may enter the conference room 830. A computing device (similar or identical to that described in FIG. 7) may receive a detection signal, corresponding to the individual 802 entering the conference room 830. In some examples, the detection signal may be sent from one or more peripheral devices in the conference room 830. For example, the camera 834*a* may be in a passive mode, only detecting movement. The camera 834*a* may detect movement and transition to an active mode, sending the detection signal to the computing device.

In other examples, the detection signal may be sent from a user device 745 associated with the individual 802. For example, the user device 745 may be a mobile device associated with the individual 802. In that case, the computing device may determine a detection signal identifying the mobile device based on establishing a connection with the user device 745 or by detecting one or more signals output by the user device 745, such as a Bluetooth advertising packet detected by a Bluetooth beacon installed within the room 830. The computing device may then determine that the identified mobile device is associated with the individual 802, such as based on a predefined mapping between the individual and the user device 745, e.g., based on a serial number or inventory number associated with the user device 745. One of ordinary skill in the art will recognize many other possibilities.

In any case, the computing device may then transmit a control signal to the one or more peripheral devices such that the peripheral devices enter an active state. The active state may enable the one or more peripheral devices to transmit audio and video data to the computing device and/or the video conference provider 850 (e.g., for a video conference). In some examples, the computing device may send a signal to the user device 845 such that the user device 845 may control the one or more peripheral devices.

The computing device may also determine, based on the detection signal, that the individual 802 is associated with the virtual space 850. In some examples, the camera may capture images of the individual entering the room and transmit them to the computing device. The computing device may then perform facial recognition using a trained ML model to recognize the individual. After recognizing the individual, the computing device may determine one or more virtual spaces associated with the individual and select one to join. The selection may be automatic if the individual is only associated with one virtual space. Alternatively, the computing device may prompt the individual, such as by presenting a listing of virtual spaces associated with the individual on a display screen, such as on one of the peripheral devices or on a user device. The computing device may then join the selected virtual space 850. Alternatively, in some examples, the computing device may prompt the individual 802 to join the virtual space 850.

Additionally, the computing device may transmit an alert that the individual 802 is active in the conference room 830 to the video conference provider 810. The video conference provider 810 may then store data associated with the alert in the virtual space 850. The video conference provider 810 may also transmit the alert to other members of the virtual space 850.

In yet another embodiment, multiple individuals may enter the conference room. The computing device may then determine a list of virtual spaces associated with all of the users and/or a list of all virtual spaces associated with any of the individuals. The computing device may then send a signal to one or more of the individuals, prompting the one or more individuals to select one or more virtual spaces. The computing device may then join a virtual space based on the selection(s) made by the one or more individuals.

After joining the virtual space 850, the computing device may send a video conference request to the video conference provider 810. The video conference provider 810 may then start a video conference associated with the virtual space 850. This may occur even if no video conference is scheduled or no other remote participants are attempting to join. Instead, the video conference may be established and presented within the virtual space for other members to note and, if desired, observe or join. The video conference provider 810 may then provide access to the video conference via the virtual space 850, as described in FIGS. 4-5. The computing device may then join the video conference, enabling transmissions and data from the one or more peripheral devices to be provided in the video conference. Further, the video conference request may cause the video conference provider 810 to transmit a meeting signal to one or more client devices 840*a-b*. The meeting signal may be used by the client devices 840*a-b* to prompt a user to remotely join the video conference.

Figure 9:
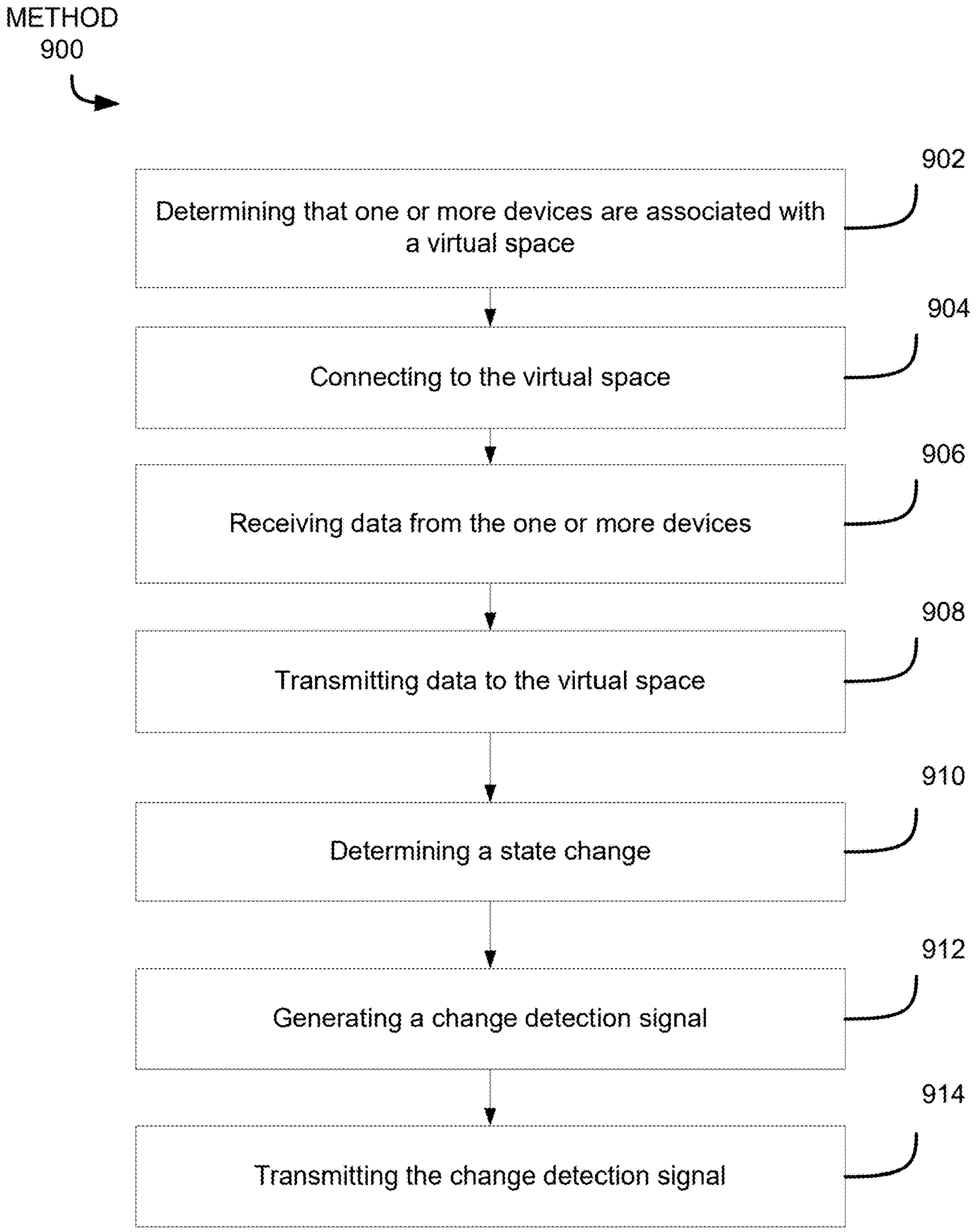
FIGS. 9-10 show example methods for providing persistent hybrid virtual collaborative workspaces.

FIG. 9 illustrates a flowchart of a method 900 for providing an enhance conference room. The method 900 may be performed by any or all of the systems described above, such as the system 700 in FIG. 7. At step 902, a computing device may determine that one or more users present in the conference room are associated with a virtual space. The computing device may receive a detection signal corresponding to an individual entering a conference room. The conference room may be associated with a virtual space hosted by a virtual conference provider. In some examples, the detection signal is transmitted from one or more peripheral devices. The peripheral devices may include a camera, a microphone, a smart whiteboard, and/or a display. For example, a camera may capture an image of one or more persons within the conference room and provide it to the computing device for facial recognition. In some examples, the image may be transmitted to another computing device, such as at the video conference provider, to recognize the persons in the room. In other examples, the detection signal may be sent from a user device associated with the individual. For example, the user device may be a mobile device associated with the individual. In that case, the computing device may determine a detection signal identifying the mobile device, such as based on receiving a communication from the mobile device, e.g., if the user connects to the computing device. The computing device may then determine that the identified mobile device is associated with the individual. In other embodiments, the computing device may determine the virtual space based on a user input, such as to one or more of the peripheral devices in the conference room. For example, the user may enter their name or other user identifier when they begin working in the conference room, such as to initiate a video conference. The computing device may determine the user's identity. After determining the user's identity, it may communicate with the video conference provider to determine one or more virtual spaces associated with the user. If the user is associated with multiple virtual spaces, it may ask the user to select one of the virtual spaces, such as by displaying the different virtual spaces on a touch display screen and accepting a user touch input.

At step 904, the computing device may connect to the virtual space, generally as described above with respect to at least FIG. 5. At step 906, the computing device may receive data from the one or more peripheral devices. The computing device may also receive data from the one or more user devices. In some examples, the data may be associated with a video conference. For example, the computing device may receive audio and/or video signals from a camera and/or microphone. The computing device may also receive an input from a smart white board or other input device. In some examples, the computing device may receive an indication that a member of the virtual space is attempting to virtually join the conference room. The computing device may then join a video conference via the virtual space. The member may then be joined as a participant in the video conference.

In an example, in response to receiving data from the one or more user devices, the computing device may determine identities of users associated with the one or more user devices. The computing device may then transmit a roster signal to the video conference provider. The roster signal may include the identities of the users, and cause the video conference provider to store data associated with the roster signal in the virtual space. The roster signal may also cause the video conference provider to send an alert to one or more client devices, indicating that a meeting is in progress.

At step 908, the computing device may transmit at least a portion of the data received from the one or more peripheral devices and/or the one or more user devices to the video conference provider. The data may be used to update the virtual space, generate alerts to the virtual space, begin a video conference, create a new virtual space, or any other related operation. For example, the virtual space may be updated to include the roster of identities in the conference room as being present at a specified date and time. The virtual space may also be updated to include one or more documents used in the meeting, and/or audio and video data from the one or more peripheral device.

At step 910, the computing device may determine a state change in one or more physical objects associated with the conference room. For example, a user might change something on a physical whiteboard, such as by writing or drawing on the whiteboard or erasing something already present, or add or remove an item from a pinboard. The computing device may receive a signal from one or more of the peripheral devices, where the signal includes information related to the state change (e.g., a video feed of an item being added to a pinboard). The computing device may then determine that the state change occurred, and send a change detection signal to the video conference provider causing the virtual space to store data associated with the state change. In some examples, the computing device may determine that a state change occurred from a live feed from the one or more peripheral devices via a machine learning model trained in object recognition or other such method. In other examples, the computing device may determine the state change occurred based on signals taken at regular intervals (e.g., a series of pictures taken by a camera evert 15 seconds, where the state change is determined by comparing two or more sequential pictures). A machine learning model may then be used to determine if the signals include a change to a resource in the conference room, or is an unimportant change (e.g., people moving within the conference room).

At step 912, the computing device may generate a change detection signal. The change detection signal may indicate that a change to a physical object has occurred. The change detection signal may also include information about the change. For example, the information may include an update to a physical pinboard (e.g., a meeting participant adding a new item), a change to a physical white board (e.g., a user drawing a new figure on the whiteboard), or other such changes.

At step 914, the computing device may transmit the change detection signal to the video conference provider. The video conference provider may store data associated with the change detection signal in the virtual space. In some examples, the video conference provider may cause an alert to be sent to one or more client devices, indicating that a change was made. The method 900 may repeat any number of times after transmitting the change detection signal to the video conference provider. Thus, the method 900 may track changes over time, providing a record of all changes made within the conference room.

Figure 10:
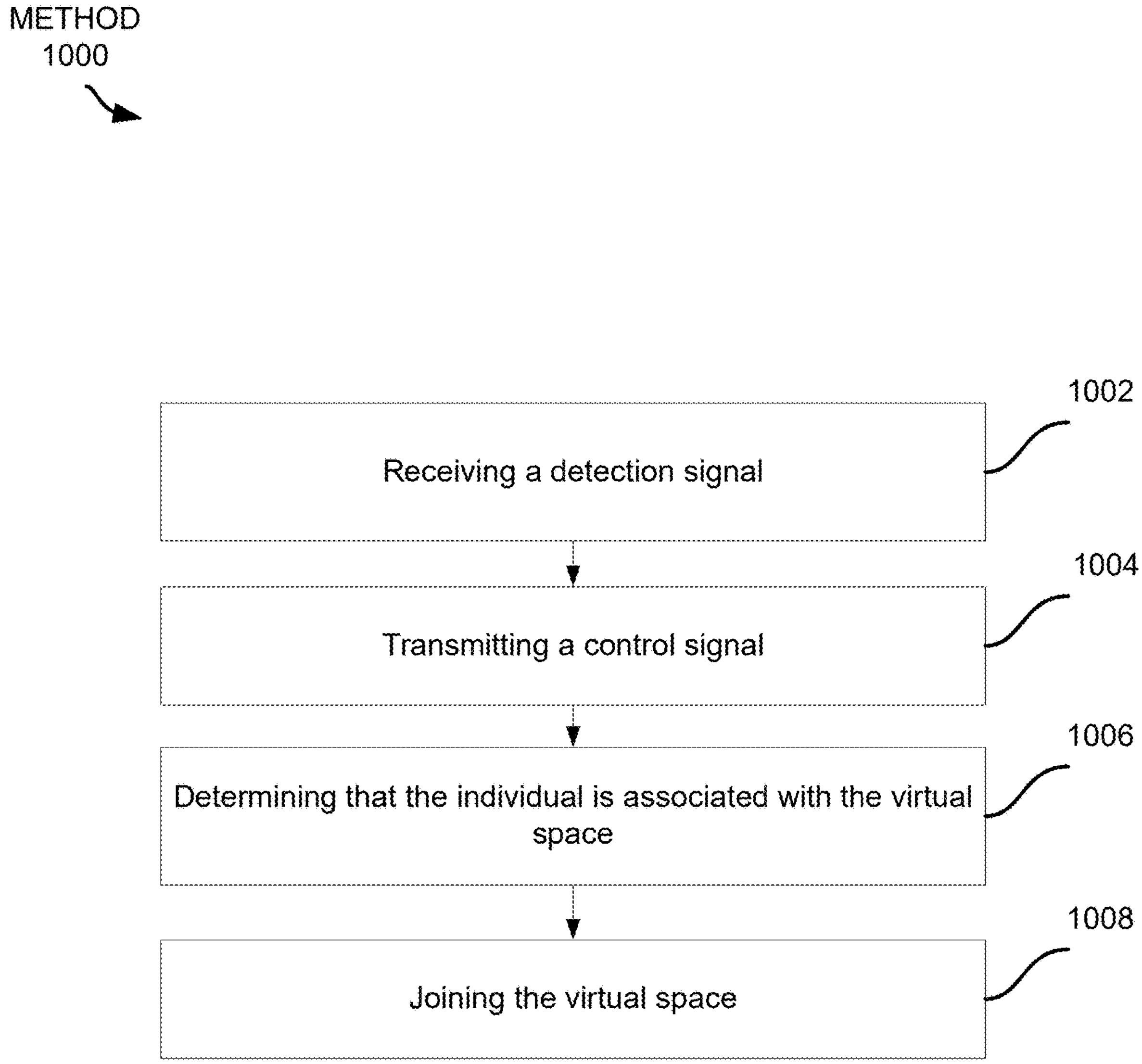

FIG. 10 shows a flowchart of a method 1000 for automatically joining a virtual space. The method 1000 may be performed by any or all of the systems described above, such as the system 800 in FIG. 8. At step 1002, a computing device may receive a detection signal corresponding to an individual entering a conference room. The conference room may be associated with a virtual space hosted by a virtual conference provider. In some examples, the detection signal is transmitted from one or more peripheral devices. The peripheral devices may include a camera, a microphone, a smart whiteboard, and/or a display. In other examples, the detection signal may be sent from a user device associated with the individual. For example, the user device may be a mobile device associated with the individual. In that case, the computing device may determine a detection signal identifying the mobile device. The computing device may then determine that the identified mobile device is associated with the individual.

At step 1004, the computing device may transmit a control signal to one or more of the peripheral device. The control signal may cause the peripheral devices to enter an active state. The active state may enable the one or more peripheral devices to transmit audio and video data to the computing device and/or the video conference provider (e.g., for a video conference). In some examples, the computing device may send a signal to the user device such that the user device may control the one or more peripheral devices.

At step 1006, the computing device may determine that the individual is associated with the virtual space. At step 1008, in response to determining the individual is associated with the virtual space, the computing device may automatically join the virtual space. In some examples, the computing device may send a signal to the user device causing the user device to join the virtual space. In other examples, the computing device may send a join signal to the user device. The user device may use the join signal may prompt the user to join the virtual space.

In some examples, the computing device may transmit a video conference request to the video conference provider. The video conference provider may then start a video conference associated with the virtual space. The video conference provider may then provide access to the video conference to a remote user. The computing device may then join the video conference, enabling transmissions and data from the one or more peripheral devices to be provided in the video conference. Further, the video conference request may cause the video conference provider to transmit a meeting signal to the user device. The meeting signal may be used by the user device to prompt a user to remotely join the video conference.

In some examples, the computing device may transmit a signal to the video conference provider. The video conference provider may use the signal to create an alert that the individual is active in the virtual space. The video conference provider may transmit the alert to one or more client devices associated with members of the virtual space. The video conference provider may also update the virtual space using the alert.

Figure 11:
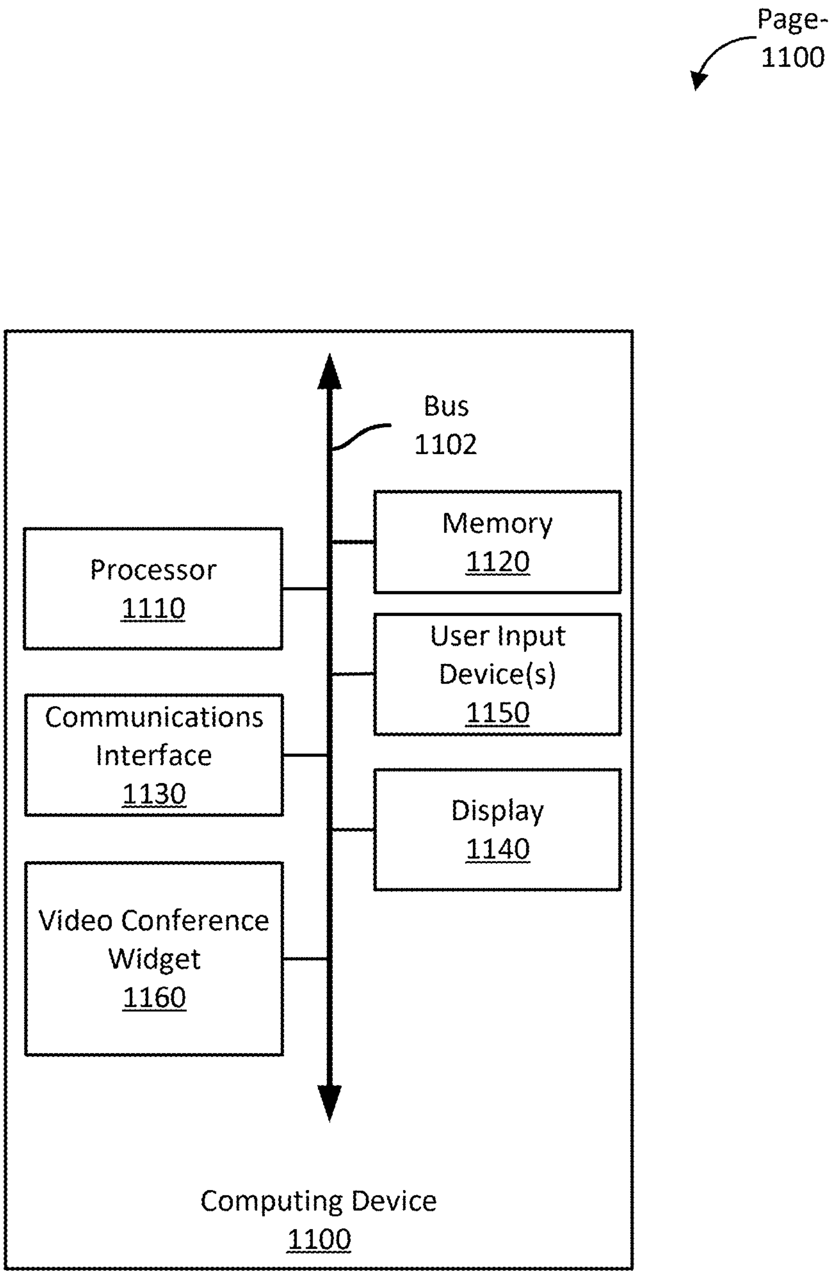
FIG. 11 shows an example computing device suitable for use with various systems and methods for persistent hybrid virtual collaborative workspaces.

FIG. 11 shows an example computing device 1100 suitable for use in example systems or methods for providing applications in a meeting, according to certain examples. The example computing device 1100 includes a processor 1110 which is in communication with the memory 1120 and other components of the computing device 1100 using one or more communications buses 1102. The processor 1110 is configured to execute processor-executable instructions stored in the memory 1120 to perform one or more methods relating to joining a virtual space by or from a conference room, such as part or all of the methods 900, 1000. The computing device, in this example, also includes one or more user input devices 1150, such as a keyboard, mouse, touchscreen, video input device (e.g., one or more cameras), microphone, etc., to accept user input. The computing device 1100 also includes a display 1140 to provide visual output to a user.

The computing device 1100 also includes a communications interface 1130. In some examples, the communications interface 1130 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

connecting, by a computing device, a physical room to a virtual space hosted by a virtual conference provider, the physical room includes one or physical more objects, the virtual space having a plurality of members;

determining, by the computing device, a state change of a first physical object of the one or more physical objects; and outputting, by the computing device, a change detection signal to the virtual conference provider to cause the virtual conference provider to notify one or more members of the plurality of members of the virtual space indicating the state change of the first physical object.

2. The method of claim 1, wherein determining the state change comprises capturing one or more images of the physical room using a camera positioned within the physical room.

3. The method of claim 1, wherein determining the state change comprises receiving a video feed from a camera positioned within the physical room.

4. The method of claim 1, wherein the change detection signal comprises information about the determined state change.

5. The method of claim 1, wherein connecting the physical room to the virtual space is based on detecting a user entering the physical room.

6. The method of claim 1, further comprising:

establishing a virtual conference using the connection to the physical room;

determining the state change during the virtual conference;

concluding the virtual conference; and maintaining the connection to the virtual space after the virtual conference has concluded.

7. The method of claim 1, wherein the first physical object comprises a pinboard, a whiteboard, or a smart whiteboard.

8. A system comprising:
a communications interface;
a non-transitory computer-readable medium; and
one or more processors configured to execute processor-executable instructions stored in the non-transitory computer-readable medium to:
connect a physical room to a virtual space hosted by a virtual conference provider, the physical room includes one or physical more objects, the virtual space having a plurality of members;
determine a state change of a first physical object of the one or more physical objects; and
output a change detection signal to the virtual conference provider to cause the virtual conference provider to notify one or more members of the plurality of members of the virtual space indicating the state change of the first physical object.

9. The system of claim 8, wherein the one or more processors are configured to execute further processor-executable instructions stored in the non-transitory computer-readable medium to capture one or more images of the physical room using a camera positioned within the physical room.

10. The system of claim 8, wherein the one or more processors are configured to execute further processor-executable instructions stored in the non-transitory computer-readable medium to receive a video feed from a camera positioned within the physical room.

11. The system of claim 8, wherein the change detection signal comprises information about the determined state change.

12. The system of claim 8, wherein connecting the physical room to the virtual space is based on detecting a user entering the physical room.

13. The system of claim 8, wherein the one or more processors are configured to execute further processor-executable instructions stored in the non-transitory computer-readable medium to:
establish a virtual conference using the connection to the physical room;
determine the state change during the virtual conference;
conclude the virtual conference; and
maintain the connection to the virtual space after the virtual conference has concluded.

14. A non-transitory computer-readable medium comprising processor-executable instructions configured to cause one or more processors to:
connect a physical room to a virtual space hosted by a virtual conference provider, the physical room includes one or physical more objects, the virtual space having a plurality of members;
determine a state change of a first physical object of the one or more physical objects; and
output a change detection signal to the virtual conference provider to cause the virtual conference provider to notify one or more members of the plurality of members of the virtual space indicating the state change of the first physical object.

15. The non-transitory computer-readable medium of claim 14, further comprising processor-executable instructions configured to cause the one or more processors to capture one or more images of the physical room using a camera positioned within the physical room.

16. The non-transitory computer-readable medium of claim 14, further comprising processor-executable instructions configured to cause the one or more processors to receive a video feed from a camera positioned within the physical room.

17. The non-transitory computer-readable medium of claim 14, further comprising processor-executable instructions configured to cause the one or more processors to:
establish a virtual conference using the connection to the physical room;
determine the state change during the virtual conference;
conclude the virtual conference; and
maintain the connection to the virtual space after the virtual conference has concluded.

* * * * *